United States Patent [19]

More

[11] 4,359,337
[45] Nov. 16, 1982

[54] PROCESS FOR THE MANUFACTURE OF BASIC SLAGS FOR THE ELECTROSLAG REMELTING PROCESS

[75] Inventor: Anton More, Burghausen, Fed. Rep. of Germany

[73] Assignee: Wacker-Chemie GmbH, Munich, Fed. Rep. of Germany

[21] Appl. No.: 297,967

[22] Filed: Aug. 31, 1981

[30] Foreign Application Priority Data

Sep. 26, 1980 [DE] Fed. Rep. of Germany ....... 3036461

[51] Int. Cl.³ .............................................. C22B 9/10
[52] U.S. Cl. ..................................... 75/257; 75/10 R; 75/53
[58] Field of Search .................. 75/53, 10 R, 257; 148/26

[56] References Cited

U.S. PATENT DOCUMENTS

| | | | |
|---|---|---|---|
| 3,551,137 | 12/1970 | Bhat | 75/257 |
| 3,723,094 | 3/1973 | Schlatter | 75/257 |
| 3,950,163 | 4/1976 | Nafziger | 75/257 |

FOREIGN PATENT DOCUMENTS 979583  1/1965  United Kingdom ............. 75/10 R

OTHER PUBLICATIONS

Duckworth and Hoyle, "Electro-Slag Refining," p. 10 (1969).

*Primary Examiner*—P. D. Rosenberg
*Attorney, Agent, or Firm*—Allison C. Collard; Thomas M. Galgano

[57] ABSTRACT

The invention relates to a process for the manufacture of basic slags for the electroslag remelting process, with the oxidic components corresponding to the desired composition, which may have a fluoridic content of not more than 5% by weight, and the fluoridic components corresponding to the desired composition, which may have an oxidic content of not more than 5% by weight, being melted separately. The slags manufactured according to the invention have a particularly low moisture content.

4 Claims, No Drawings

PROCESS FOR THE MANUFACTURE OF BASIC SLAGS FOR THE ELECTROSLAG REMELTING PROCESS

The invention relates to a process for the manufacture of basic slags for the electroslag remelting process (also referred to herein as the "ESR process"). More particularly, it relates to the manufaccture of such basic slags which have an analytical content of:
- 0.2–15% by weight of $SiO_2$;
- 12–40% by weight of $Al_2O_3$;
- 15–40% by weight of an alkaline earth metal oxide;
- 12–75% by weight of $CaF_2$;
- up to 0.5% by weight of FeO;
- up to 1% by weight of MnO;
- up to 10% by weight of $TiO_2$; and
- impurities resulting from the raw materials.

Slags of the above-mentioned composition are commercially available and have previously been used for refining steel according to the electroslag remelting process. According to this process, a steel ingot connected as an electrode in a basic slag heated to from 1700° to 1900° C. by means of an electric current, is caused to drip and to react with the slag and, as a result, is freed from oxidic and sulphidic impurities.

A secondary reaction that occurs in such a process is the reaction of the residual water contained in the slag with the molten steel. This results in the formation of hydrogen.

The problems arising as a result of this are well known—hydrogen is highly soluble in molten steel. During solidification, the solubility of the hydrogen in the steel decreases at an irregular rate and becomes even less as the temperature decreases further.

If the hydrogen is not removed from the steel ingot by reannealing, which has a duration of from days to weeks as appropriate, then hydrogen fissures form. Consequently, the steel ingot becomes useless.

Slags that have a particularly low moisture content must therefore be used for the remelting of hydrogen-sensitive types of steel according to the "ESR process", especially with large steel ingots having a diameter of one meter or more. In such a case, the premelted and granulated slags that are commercially available no longer meet the very high requirements with regard to a low moisture content.

In order to obtain slags that have a particularly low moisture content, the commercially available premelted and granulated basic slags must, in addition, be annealed at approximately 1000° C. A process of this type is, however, complicated and expensive.

The object of the invention is therefore to find an economical process for the manufacture of basic slags for the "ESR process", which meet the requirement of a particularly low moisture content, especially when they are to be used for the melting of hydrogen-sensitive, large, steel ingots according to the "ESR process".

It has now, surprisingly, been found that ESR slags having low moisture values can be obtained if the oxidic and fluoridic components that correspond to the desired composition are melted separately.

The subject of the invention is a process for the manufacture of basic slags for the electroslag remelting process, which is characterized in that the slags are obtained by mixing predominantly oxidic components, in which the content of fluoridic components is not more than 5% by weight, with predominantly fluoridic components, in which the content of oxidic components is not more than 5% by weight, with the predominantly oxidic components and the predominantly fluoridic components being melted separately before being mixed.

Basic slags that have proved to be suitable for the "ESR process" are those having an analytical content of:
- 0.2–15% by weight of $SiO_2$;
- 12–40% by weight of $Al_2O_3$;
- 15–40% by weight of an alkaline earth metal oxide;
- 12–75% by weight of $CaF_2$;
- up to 0.5% by weight of FeO;
- up to 1% by weight of MnO;
- up to 10% by weight of $TiO_2$; and
- impurities resulting from the raw materials.

For the manufacture of the slags according to the invention, the same raw materials are used as those that have previously been used for the manufacture of basic slags for the "ESR process".

The predominantly oxidic components may have a content of fluoridic components of not more than 5% by weight. They are melted down, for example, in carbon-lined furnaces, the lower limit of the temperatures to be used being, of course, the melting point of the mixture. In general, the temperatures lie between 1500° and 1800° C.

The molten product is poured into iron troughs and, after being cooled, is broken down to the desired grain size, which is normally up to 30 mm.

The treatment of the predominantly fluoridic components, which may contain a maximum content of oxidic components of 5% by weight, is carried out in an analogous manner.

The slags are finally obtained by simply mixing the premelted and granulated components. The weight ratio of the components is determined according to the desired overall composition of the slag.

A good indication of the quality of the slags, with regard to their moisture content, is obtained by determining the amount of water liberated when the slags are treated at a temperature of 650° C. For this purpose, a test sample is heated in a tube to 650° C. and a moisture-free gas current is passed over the test sample. The water liberated is removed by the gas current, collected in a drying agent and determined, for example, gravimetrically.

The slags manufactured according to the invention have a water content, determined according to the above-described process, which lie in the two-figure ppm range, whereas commercially-available, premelted slags of the same chemical composition and grain size have a moisture content that is higher by a multiple thereof. Even the basic slags having a particularly low moisture content, obtained by reannealing the commercially-available premelted and granulated basic slags at approximately 1000° C., have a moisture content that is significantly higher than that of the slags according to the invention of the same chemical analysis and grain size.

In addition, the basic slags according to the invention have a better storability than do the hitherto known slags.

The invention will now be explained in greater detail by means of several Examples:

EXAMPLE 1

An oxidic component of the following composition is used:
0.57% by weight of $SiO_2$;
45.85% by weight of $Al_2O_3$;
47.24% by weight of CaO;
4.70% by weight of MgO; and
impurities resulting from the raw materials.

It is melted, at 1700° C., in a carbon-lined furnace. After a two-hour to four-hour melting-down process and, after complete and thorough melting, the mixture is poured, while still molten, into an iron trough. After being cooled, it is ground to a grain size of from 0.3 to 10 mm.

A fluoridic component of the following composition is used:
0.72% by weight of $SiO_2$;
99.09% by weight of $CaF_2$; and
impurities resulting from the raw materials.

It is melted, at a temperature of 1600° C., in a carbon-lined furnace. After a three-hour to four-hour melting-down process and, after complete and thorough melting, the molten mixture is poured off and, after being cooled, is ground to a grain size of from 0.3 to 10 mm.

The desired basic slag is obtained by mixing a 40% by weight portion of the oxidic component and a 60% by weight portion of the fluoridic component.

Accordingly, the overall composition of the slag is:
0.66% by weight of $SiO_2$;
18.34% by weight of $Al_2O_3$;
18.34% by weight of CaO;
1.88% by weight of MgO;
59.45% by weight of $CaF_2$; and
impurities resulting from the raw materials.

The moisture content of the slag is determined in the following manner;

100 g of granulated slag are placed in a tube, heated to 650° C., and rinsed constantly with dry gaseous $CO_2$. The gas current is further passed through a tube filled with magnesium perchlorate, where the water liberated from the slag and removed by the gas current is absorbed. The moisture content of the test sample is determined from the difference in weight of the absorption tube.

The moisture content was 30 ppm by weight.

Comparison Example 1.1

A slag of the same composition as that described in Example 1 is melted homogeneously, i.e., not as separate components, and ground to a grain size of from 0.3 to 10 mm.

The moisture content, determined in the same manner as described in Example 1, was 250 ppm by weight.

Comparison Example 1.2

The slag of Comparison Example 1.1 is annealed for 10 minutes at approximately 1000° C. After being cooled in air, the moisture content, determined in the same manner as described in Example 1, is 120 ppm by weight.

Storability

After storing the slags for half-a-year in paper sacks having heat-sealed polyethylene linings of 0.5 mm thickness, in a storage room in which the absolute humidity fluctuated between 4 and 17 g/m³ air (measured at standard temperature and pressure), the following moisture values were found:

| | |
|---|---|
| Slag of Example 1 | 40 ppm by weight |
| Slag of Comparison Example 1.1 | 350 ppm by weight |
| Slag of Comparison Example 1.2 | 200 ppm by weight |

EXAMPLE 2

A slag of the following composition is manufactured according to the process described in Example 1:
2% by weight of $SiO_2$;
32% by weight of $Al_2O_3$;
30% by weight of CaO;
3% by weight of MgO;
32% by weight of $CaF_2$; and
impurities resulting from the raw materials.

The water content, determined in the same manner as in Example 1 is 20 ppm by weight.

Comparison Example 2.1

A slag of the same composition as that described in Example 2 is melted homogeneously (in a manner analogous to that of Comparison Example 1.1) and ground to a grain size of from 0.3 to 10 mm.

The water content, determined in a manner analogous to that of Example 1 is 300 ppm by weight.

Comparison Example 2.2

A slag of the composition described in Example 2 and Comparison Example 2.1 is melted homogeneously and, after granulation to from 0.3 to 10 mm, is reannealed for 10 minutes at 1000° C.

After being cooled, the slag is examined for its moisture content. The moisture content, determined as described in Example 1, is 200 ppm by weight.

Storability

After storing the slags for half-a-year under the conditions described in Example 1, the following moisture values were found:

| | |
|---|---|
| Slag of Example 2 | 30 ppm by weight |
| Slag of Comparison Example 2.1 | 500 ppm by weight |
| Slag of Comparison Example 2.2 | 300 ppm by weight |

Thus, while only several examples of the present invention have been described, it will be obvious that many changes and modifications may be made thereunto, without departing from the spirit and scope of the invention.

What is claimed is:

1. A process for the manufacture of basic slags for the electroslag remelting process that have an analytical content of:
0.2–15% by weight of $SiO_2$;
12–40% by weight of $Al_2O_3$;
15–40% by weight of an alkaline earth metal oxide;
12–75% by weight of $CaF_2$;
up to 0.5% by weight of FeO;
up to 1% by weight of MnO;
up to 10% by weight of $TiO_2$; and
impurities resulting from the raw materials,
comprising the steps of:
forming a slag by mixing predominantly oxidic components, in which the content of fluoridic component is not more than 5% by weight, with predominantly fluoridic components, in which the content of oxidic components is not more than 5% by weight, the predominantly oxidic components and predominantly fluoride components being melted separately, being cooled, solidified and broken into smaller components before being mixed.

2. The process of claim 1, wherein said oxidic and fluoridic components are broken down into granulated components having a grain size up to 30 mm.

3. The process according to claim 2, wherein said granulated components have a grain size of from 0.3 to 10 mm.

4. The process of claim 1, wherein a slag having a moisture content in the two figure ppm range is produced following said mixing step.

* * * * *